US008756128B2

(12) United States Patent
Timmer et al.

(10) Patent No.: US 8,756,128 B2
(45) Date of Patent: Jun. 17, 2014

(54) SELF-PERPETUATION OF A STOCHASTICALLY VARYING RESOURCE POOL

(75) Inventors: Jurrien Timmer, Manchester, MA (US); Andrew Dierdorf, Watertown, MA (US); Walter Tsui, Wellesley, MA (US); Stephen D. Fisher, Belmont, MA (US)

(73) Assignee: FMR LLC, Boston, MA (US)

( * ) Notice: Subject to any disclaimer, the term of this patent is extended or adjusted under 35 U.S.C. 154(b) by 1122 days.

(21) Appl. No.: 11/755,426

(22) Filed: May 30, 2007

(65) Prior Publication Data

US 2008/0300836 A1 Dec. 4, 2008

(51) Int. Cl.
*G06Q 40/00* (2012.01)
(52) U.S. Cl.
USPC ............................................. 705/35; 705/37
(58) Field of Classification Search
USPC ..................................................... 705/35–37
See application file for complete search history.

(56) References Cited

U.S. PATENT DOCUMENTS

| | | | |
|---|---|---|---|
| 5,675,553 A * | 10/1997 | O'Brien et al. ............... | 367/135 |
| 5,781,460 A * | 7/1998 | Nguyen et al. ............... | 708/300 |
| 6,862,540 B1 * | 3/2005 | Welch et al. .................. | 702/44 |
| 6,985,880 B1 * | 1/2006 | Hodgdon et al. ............. | 705/36 T |
| 2002/0046145 A1 * | 4/2002 | Ittai ............................... | 705/36 |
| 2002/0174045 A1 * | 11/2002 | Arena et al. .................. | 705/36 |
| 2003/0009399 A1 * | 1/2003 | Boerner ........................ | 705/35 |
| 2004/0254872 A1 * | 12/2004 | Grzebeta et al. ............. | 705/36 |
| 2006/0089892 A1 * | 4/2006 | Sullivan et al. ............... | 705/35 |
| 2007/0156560 A1 | 7/2007 | Diffenderffer | |
| 2008/0065522 A1 | 3/2008 | Diffenderffer | |
| 2008/0097888 A1 * | 4/2008 | Sugihara ....................... | 705/37 |
| 2008/0114703 A1 * | 5/2008 | Dahlberg et al. ............. | 705/36 R |
| 2008/0208764 A1 | 8/2008 | Diffenderffer | |
| 2008/0243716 A1 * | 10/2008 | Ouimet et al. ................ | 705/36 R |
| 2010/0017338 A1 * | 1/2010 | Gorbatovsky ................. | 705/36 R |
| 2011/0119221 A1 * | 5/2011 | Mishra et al. ................. | 706/50 |

OTHER PUBLICATIONS

Bucking economic greed Anonymous. Utne. Topeka: Jul./Aug. 2003.*
Double the benefit with a split annuity Jon E Tregarthen. Life Association News. Washington: Sep. 1997.*
"Split-Funded Annuities", http://www.annuityadvantage.com/splitfunded.htm,, 3 pages (Oct. 26, 2011).

* cited by examiner

*Primary Examiner* — William Rankins
(74) *Attorney, Agent, or Firm* — Fish & Richardson P.C.

(57) ABSTRACT

A computer-readable medium has encoded thereon software for maintaining a steady-state worth of an inhomogenous renewable resource pool. The software includes instructions for causing a data-processing system to evaluate an indicator of a historical worth of the resource pool, to determine a draw amount at least in part on the basis of this indicator, and to output data representative of that draw amount.

20 Claims, 3 Drawing Sheets

SELF-PERPETUATION OF A STOCHASTICALLY VARYING RESOURCE POOL

FIELD OF DISCLOSURE

The disclosure relates to control systems, and in particular to feedback control systems for management of a resource pool.

BACKGROUND

A control system manipulates certain variables, referred to as "control variables," associated with a controlled system. It does so in an attempt to cause the controlled system to achieve a particular goal, often referred to as a "set point." A feedback control system receives information indicative of an error between the actual performance of the controlled system and the set point. It then uses this information to manipulate the control variable in an effort to reduce this error.

One system that can be placed under control of a feedback control system is a resource pool. Resource pools that include different kinds of resources, are referred to as inhomogeneous resource pools. These resource pools have a mixture of resources that fluctuate in their amounts and/or values. These fluctuations are often random fluctuations. Because of the random nature of fluctuation, such resource pools are referred to as "stochastically varying" resource pools.

Resources in resource pools can be of various types, including non-renewable resources, such as fossil fuels, or renewable resources, such as timber. Resources can also include obligations or ownership interests, the values of which depend on supply and demand of underlying resources, or of goods and services that are dependent on such resources. Such obligations and ownership interests are often referred to as bonds or shares associated with some entity.

SUMMARY

In one aspect, the invention features a method for maintaining a steady-state worth of an inhomogeneous renewable resource pool. Such a method includes evaluating an indicator of a historical worth of the resource pool, at least in part on the basis of the indicator, determining a draw amount; and outputting data representative of the draw amount.

Practices include those in which evaluating an indicator includes retrieving time series data indicative of historical worth, those in which evaluating an indicator includes low-pass filtering the time series data, those in which evaluating an indicator includes determining an average value of the time series data, and those in which evaluating an indicator includes retrieving synthetic time series data indicative of what a historical worth of the renewal resource pool would have been.

In some practices, determining a draw amount includes determining a pre-determined fraction of the historical worth.

Other practices include adjusting the draw amount on the basis of an external constraint on the draw amount.

Yet other practices include retrieving data indicative of historical worth of an endowment fund, and wherein evaluating an indicator of historical worth includes retrieving a plurality of selected values indicative of a corresponding plurality of worths of the endowment fund at each of a plurality of times.

In another aspect, the invention features a computer-readable medium having encoded thereon software for causing a data-processing system to carry out any of the foregoing methods. Such a data-processing system can be a distributed system in which constituent processors, including possibly remote processors, cooperate to carry out the foregoing methods.

A system as described herein can be implemented in hardware or software, or a combination of both. The system can be implemented in computer programs using standard programming techniques following the method steps and figures described herein. Suitable programs include those designed to execute on programmable computers and/or data processing systems, each comprising a processor, a data storage system (including memory and/or storage elements), at least one input device, and at least one output device, such as a display device or printer. Program code is applied to input data to perform the functions described herein and generate output information. The output information is applied to one or more output devices such as a display device, as described herein.

Each program is preferably implemented in a high level procedural or object oriented programming language to communicate with a computer system. However, the programs can be implemented in assembly or machine language, if desired. In any case, the language can be a compiled or interpreted language.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The system can also be considered to be implemented as a computer-readable storage medium, configured with a computer program, where the storage medium so configured causes a computer to operate in a specific and predefined manner to perform the functions described herein.

These and other features of the invention will be apparent from the following detailed description and the accompanying figures, in which:

DETAILED DESCRIPTION

Figure 1:
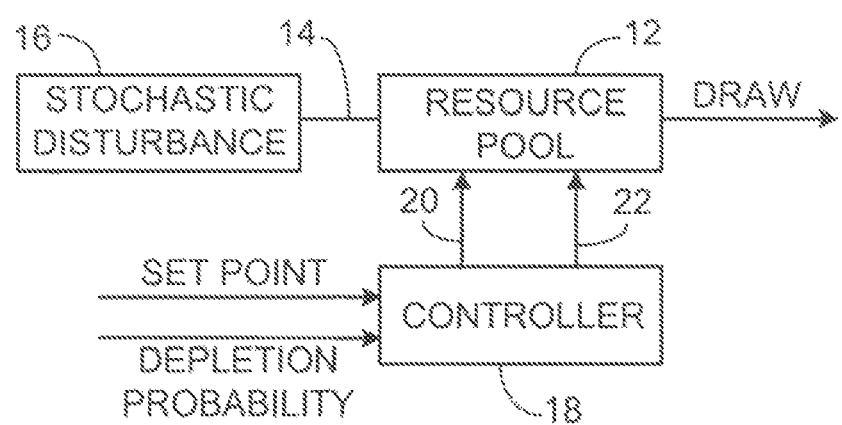
FIG. 1 shows a control system for of a controlling a renewable inhomogeneous resource pool.

Referring to FIG. 1, an inhomogeneous resource pool 12 is one that includes resources of different types. For example, the resources in a resource pool 12 may be different types of fuel, such as coal and oil. Or the resources may be different types of grain to be used in connection with manufacture of foods, or different raw materials to be used in a manufacturing process.

A resource pool 12 may contain assets, such as different types of financial instruments, whose individual values fluctuate. In some cases, a resource pool 12 may include, among its constituent assets, other resource pools, such as mutual fund shares. A resource pool 12 of the type described herein can also include, as a constituent asset thereof, one or more resource pools of the type described herein. A resource pool 12 can be characterized by the type of resource and the quantity of that resource. For example, a resource pool 12 can be an oil deposit having a certain number of barrels of oil reserves. This characterization provides a basis for estimating the worth of that resource pool 12. However, in the case of an inhomogenous resource pool, this exercise becomes problematic. For example, if the resource pool 12 includes a gold mine, an oil field, a set of shares, and a set of bonds, it can no longer be characterized by a type and quantity of a resource.

To avoid such difficulties, one often characterizes an inhomogenous resource pool 12 by estimating a scalar value indicative of the worth of each constituent resource. These scalar values can then be added together to provide an overall worth for the entire resource pool 12 itself.

Another way to assign a worth to a resource pool 12 is to assign values to entities that depend in some way on underlying resources. Typical entities include companies organized to, in some way, profit from the existence of one or more resources. The worths of such companies are made manifest by worths of associated financial instruments and derivatives thereof. As a result, the worth of an inhomogenous resource pool 12 can be measured by worths of assets, such as different types of financial instruments.

In some cases, the resources in a resource pool 12 are renewable resources. For example, a resource may be a stand of timber, a herd of livestock, or a colony of microbes to be used, for example, in vaccine production, or as leavening or fermentation agents in food production. However, renewability does not necessarily mean immortality. Even a renewable resource pool can be completely depleted. For example, if the harvest rate for a stand of timber exceeds the growth rate, or replacement rate, eventually that stand will be fully depleted.

A resource pool 12 that includes financial instruments can likewise be fully depleted if the withdrawal, or distribution rate, exceeds the rate at which those instruments appreciate in value. In many cases, it is desirable to control a renewable resource pool such that the renewal rate of the pool will match a rate at which resources are drawn from that resource pool 12, hereafter referred to as the "draw rate." A renewable resource pool 12 controlled in this way will tend to achieve a steady-state worth. This steady-state worth shall be referred to herein as the "capital" of the resource pool 12.

The aggregate worth of resources within the resource pool 12 depends, to some extent, on a fluctuation signal 14 provided by a stochastic disturbance source 16. For example, in the case of an inhomogeneous resource pool 12 containing different stands of timber, there may be fluctuations in the growth rate and harvest rate of each stand. Or, when the resource pool 12 is a collection of one or more mutual funds, or financial instruments, the stochastic disturbance source 16 may be viewed as representing the fluctuations in the underlying supply and demand associated with those resources. These fluctuations in supply and demand, as represented by the fluctuation signal 14, cause the value of the resources in the resource pool 12 to vary in a way that forecloses complete predictability. The stochastic nature of the fluctuation signal 14 causes the resource pool 12 to be a stochastically-varying resource pool 12.

In many cases, one may wish to maintain a resource pool 12 at some steady-state condition. Such a steady-state condition can be characterized by a constant quantity of the various resources that make up the resource pool 12. Alternatively, the steady-state condition can be characterized by a constant, or essentially constant capital, typically measured in units of a normalized currency. As used herein, a normalized currency is one that is normalized to its value at a particular time. An example of a normalized currency is an inflation or deflation adjusted dollar, which is pegged to the value that it attains at a particular time.

For example in managing an endowment, one often wishes to maintain the worth of the endowment's capital, while simultaneously providing a worth stream to fund whatever is to be endowed. In such cases, this output worth stream tends to draw worth from the capital. By adjusting the draw rate to match the capital's renewal rate, one can maintain the capital at a constant, or nearly constant, worth.

The fluctuation signal 14 often includes high-frequency components that make it difficult to maintain the capital of the resource pool 12. For example, a short-term fluctuation that results in an unexpected worth decrease might result in an unnecessarily decreased draw rate. Conversely, a fluctuation that results in an unexpected worth increase might result in an excessively spendthrift draw on the resource followed by an excessively parsimonious draw rate to compensate for the earlier profligacy.

In response to the fluctuation signal 14, a controller 18 urges the resource pool 12 to maintain a steady-state value. It does so by controlling either or both: (1) the constituent resources of the resource pool 12; and (2) the draw rate of the resource pool 12. It controls the former by generating a resource control signal 20, and it controls the latter by generating a draw control signal 22.

A feedback control signal 23 includes information indicative of the state of the resource pool 12 as well as information representative of economic indicators. In part on the basis of the feedback signal 23, the controller 18 generates a resource control signal 20 that dynamically controls the underlying contents of the resource pool 12. For example, in a financial services application, the resource control signal 20 may cause re-allocation between volatile and non-volatile assets, such as between stocks and bonds, or between different classes of stocks (e.g. small-cap and large-cap stocks, common and preferred stocks, and/or domestic and international stocks), between individual stocks, or it may reallocate resources into or out of real estate based instruments, commodity-based instrument, or hedge funds.

The draw control signal 22 acts as a regulator to govern the rate at which resources are drawn from the resource pool 12. This draw control signal 22 depends in part on the passage of a time series through a low-pass digital filter. Preferably, the time series represents a historical worth of the resource pool 12. For example, in some practices, the controller 18 inspects a database containing time series data representative of historical values indicative of the worth of the resource pool 12. In some cases, the values of the time series are calculated assuming that none of the draw amounts are re-invested but that any capital gains or dividends in excess of the draw amount are re-invested.

A typical time series includes monthly samples of the worth of the resource pool 12 over some evaluation interval. A suitable evaluation interval, for example, could include thirty-six monthly samples extending back from the present, with the first sample being obtained during the preceding month. However, the extent of the evaluation interval, the number of samples within it, and the interval between those samples can be varied to suit the particular application. The passage of such a time-series through a low-pass digital filter tends to filter out high-frequency components of the stochastically varying fluctuation signal 14. The filter transfer function is controlled by varying the evaluation interval. In the present embodiment, the filter transfer function would drop to zero at some frequency, the selection of which sets the filter's bandwidth. The resulting discontinuity in the filter transfer function would correspond to ignoring time series data beyond the edge of the evaluation interval. However, one could also provide a filter-transfer function that gradually declines to zero. This would correspond to weighting the time-series data, and would provide a way to magnify the influence of some portions of the data without completely ignoring other portions of the data.

The output of the digital filter can be viewed as an average worth of the resource pool 12 during the evaluation interval after a draw for that month has occurred. This results in a moving average of the worth of the resource pool 12. In response to this output, the controller 18 generates a draw control signal 22 that causes a pre-determined fraction of the worth of the resource pool 12 to be drawn. In some practices, the pre-determined fraction is 5%, however other fractions can also be used. The controller 18 selects both the draw control signal 22 and the resource control signal 20 such that the resource pool 12 maintains a steady-state worth.

The inputs to the controller 18 include a desired steady-state worth and a stated probability. The stated probability, which can be steady or variable, represents the probability that the resource pool 12 will maintain a given value over a selected interval.

The stated probability can be used to control the draw percentage, the evaluation interval and/or the composition of the resource pool 12. However, in some embodiments, there is no stated probability input, and both the draw percentage and the extent of the evaluation interval are predetermined.

In response to one or more of the foregoing inputs, the controller 18 causes the resource pool 12 to be drawn upon at a rate selected such that the value of the resource pool 12 remains at a desired steady-state value. The controller 18 does so by controlling the draw rate and/or the composition of the resource pool 12.

In some embodiments, the controller 18 applies conventional actuarial techniques. However, in other embodiments, the controller 18 applies techniques other than actuarial techniques, such as financial, economic, heuristic investment techniques, and/or combinations thereof.

In some cases, one or more of the foregoing inputs can be set to a default value, in which case it is not necessary to explicitly provide that input to the controller 18.

Figure 2:
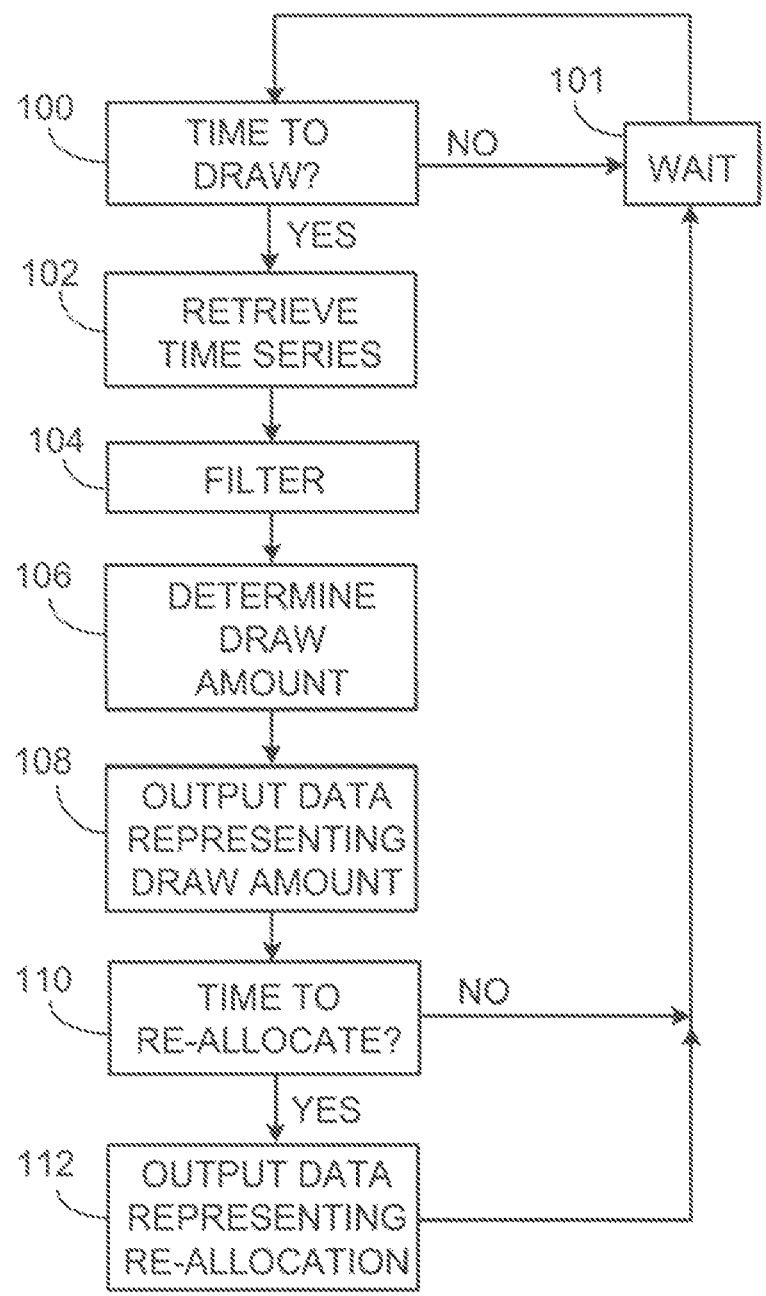
FIG. 2 is a block diagram showing the operation of the control system of FIG. 1.

FIG. 2 shows an exemplary procedure carried out by the controller 18 in maintaining a steady-state worth of the resource pool 12. The procedure begins with the controller 18 receiving inputs (step 100). These inputs include the evaluation interval, the frequency with which draws are to be made, and a desired set point for the steady-state value. Additional inputs can include an initial depletion rate, a frequency at which the depletion rate is to be recalculated, and any constraints on the composition of the resource pool 12.

Suitable constraints include those associated with funds in which asset allocation of the funds is changed over time by the fund managers in response to changing circumstances. Such funds are often referred to as "dynamic allocation funds." Dynamic allocation funds adaptively change allocation on the basis of circumstances.

The method described herein can be used in conjunction with inhomogenous resource pools 12 representative of endowment funds subject to a dynamic asset allocation process, in which the asset allocation changes over time in an effort to maintain a steady-state worth for a given draw rate.

In another aspect, the method includes determining a first asset allocation of an endowment fund for a first time period based on the inputs, and determining a second asset allocation of the endowment fund, different from the first asset allocation, for a second time period based on updated inputs.

The method also includes determining the revised payment amount made for a predefined period based on the performance of the endowment. This is advantageous to enable the draw rate and/or investment strategy for an endowment fund to automatically switch from higher-risk to lower-risk assets in response to changing circumstances.

In some implementations, the endowment fund's assets are allocated by asset type. Asset types can include domestic and international equity funds, investment-grade and high-yield fixed income funds, and short term investments like money market funds, certificates of deposit (CDs), or treasury bills (T-bills). Other investment vehicles can include alternative asset types such as real estate and private investments, or more traditional asset types such as mutual funds, commingled pools, and/or separate accounts.

In some embodiments, the asset type having the largest percentage of assets over a period of time during existence of the investment includes domestic equities. In other embodiments, the endowment includes one or more high risk asset types, such as international equities and high yield bonds.

The controller 18 begins by determining whether it is time to draw from the resource pool 12 (step 100). If it is not yet time, the controller 18 waits (step 101) and tries again later (step 100).

If the controller 18 determines that it is time to draw, it first retrieves the time series data (step 102). Then, the controller passes the time series data through a digital filter to remove high-frequency components representative of short-term fluctuations in the time-series (step 104). The controller 18 then determines a draw amount based on the filtered data (step 106). Typically, this draw amount is a certain percentage of a moving average of those elements of the time series that are within the evaluation interval. After determining the draw amount, the controller 18 outputs data representative of the draw amount to be used for executing the draw on the resource pool (step 108). This output data is thus a tangible entity that is relied upon for any subsequent trades or redemptions that are deemed necessary to provide the draw amount to an intended beneficiary.

In those embodiments that implement dynamic reallocation, the controller 18 determines if there exists a need to change the composition of the pool 12 by reallocation between its constituent resources (step 110). If so, the controller outputs data representative of a recommended reallocation (step 112). This output data is thus a tangible entity that is relied upon in the execution of subsequent trades necessary to execute the reallocation.

A decision to inspect the resource pool in an effort to determine whether re-allocation is necessary can be made based on the passage of time, for example semi-annually, or annually, or on the extent of fluctuations in, for example, a market index. For example, one might inspect the resource allocation on a regular basis. However, if the controller 18 detects a sudden change in a market index, there may be motivation to inspect the resource pool to determine whether the sudden change will require a re-allocation of resources.

In providing the output data representative of resource allocation, the controller 18 may apply actuarial, financial, economic, and/or heuristic methods to actual fluctuations in the output of the stochastic disturbance source 16 and to forecasts of future outputs.

The foregoing description assumes that time series data exists for the entire evaluation interval. However, this is generally not the case when the resource pool is first assembled. In particular, one cannot have thirty-six months of actual time series data until the resource pool 12 is at least thirty-six months old.

To avoid this difficulty, one practice of the method described herein includes providing synthetic historical data to fill in the time series at those points in which no real data is available. Such synthetic data can be obtained on the basis of historical data representative of market indicators, or historical data representing the values of the individual resources before those resources were assembled together into a resource pool.

In some cases, there exist externalities that limit or otherwise affect the draw rate. For example, in the case of a resource pool 12 containing financial instruments, there may be tax laws that impose constraints on either the maximum amount that may be drawn, the draw rate, or both.

Figure 3:
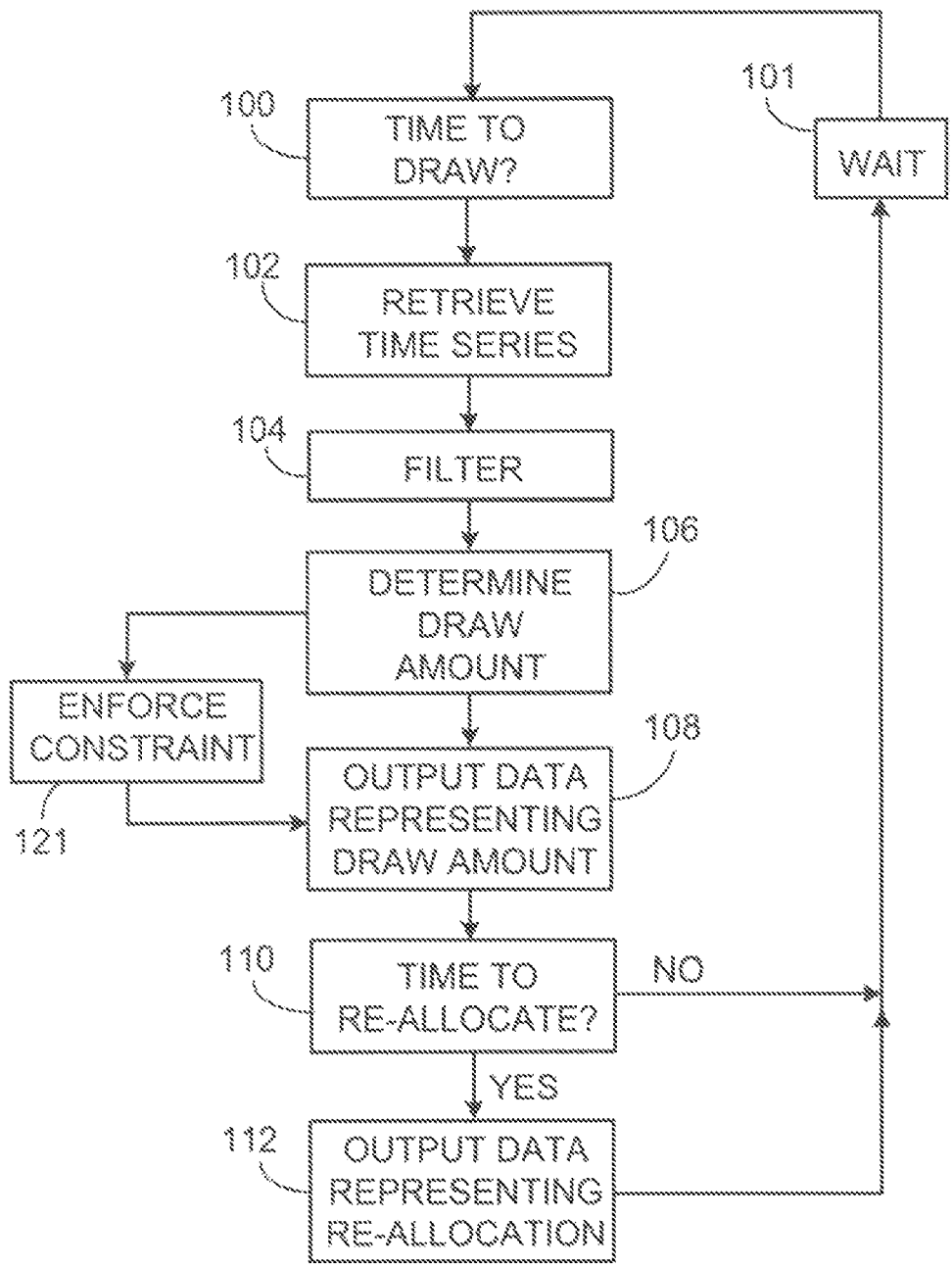
FIG. 3 is a block diagram showing the operation of the control system subject to an external constraint on depletion amount.

To accommodate such externalities, an alternative implementation, shown in FIG. 3, follows the determination of draw amount (step 106) with that of calculating any additional constraints on that amount (step 121). The resulting draw amount is then adjusted on the basis of any such constraints (step 122) before being relied upon for executing a draw from the pool 12 (step 108).

An investor who provides resources in the resource pool 12 would have complete control over those resources. For example, in some embodiments, the investor can draw resources at any time. In other embodiments, the investor can add resources to the resource pool 12. Such changes can easily be accommodated because, in principle, they are no different from a stochastic disturbance from the stochastic disturbance source 16.

The composition of the resource pool 12 is typically a diversified mix of investments, including mutual funds that invest in US and foreign stocks, bonds, and cash investments. A realistic minimum initial value, or initial investment, would be US$100,000, with a mutual fund expense ratio of 1% and no additional fees.

It is to be understood that while the invention has been described in conjunction with the detailed description thereof, the foregoing description is intended to illustrate and not limit the scope of the invention, which is defined by the scope of the appended claims.

Having described the invention, and a preferred embodiment thereof, what we claim as new and secured by letters patent is:

1. A computer program product tangibly embodied on a non-transitory computer-readable storage device for\managing a resource pool, the computer program product comprising instructions for causing a data-processing system to:
   maintain a steady state worth of an inhomogeneous renewable resource pool, by instructions to:
   evaluate an indicator of a historical worth of the inhomogeneous renewable resource pool, wherein evaluating an indicator comprises retrieving, by the data processing system, time series data indicative of the historical worth of the resource pool, and
   determine a draw amount from the inhomogeneous renewable resource pool, the draw amount determined at least in part on the basis of the indicator; and
   output data representative of the draw amount determined so as to maintain the steady state worth of the inhomogeneous renewable resource pool.

2. The computer-readable medium of claim 1, wherein the instructions for causing a data processing system to evaluate an indicator comprise instructions for causing a data processing system to low=pass filter the time series data.

3. The computer-readable medium of claim 1, wherein the instructions for causing a data processing system to evaluate an indicator comprise instructions for causing a data processing system to determine an average value of the time series data.

4. The computer-readable medium of claim 1, wherein the instructions for causing a data processing system to evaluate an indicator comprise instructions for causing a data processing system to retrieve synthetic time series data indicative of what a historical worth of the renewal resource pool would have been.

5. The computer-readable medium of claim 1, wherein the instructions for causing a data processing system to determine a draw amount comprise instructions for causing a data processing system to determine a pre-determined fraction of the historical worth.

6. The computer-readable medium of claim 1, wherein the software further comprises instructions for causing a data processing system to adjust the draw amount on the basis of an external constraint on the draw amount.

7. The computer-readable medium of claim 1, wherein the software further comprises instructions for retrieving data indicative of historical worth of an endowment fund, and wherein the instructions for causing a data processing system to evaluate an indicator of historical worth comprise instructions for causing a data processing system to retrieve a plurality of selected values indicative of a corresponding plurality of worths of the endowment fund at each of a plurality of times.

8. The system of claim 1, wherein the instructions for causing the one or more computers to evaluate an indicator comprise instructions for causing a data processing system to retrieve synthetic time series data indicative of what a historical worth of the renewal resource pool would have been.

9. The system of claim 1, wherein the instructions for causing the one or more computers to determine a draw amount comprise instructions for causing a data processing system to determine a pre-determined fraction of the historical worth.

10. The system of claim 1, wherein the instructions are further operable, when executed by the one or more computers, to cause the one or more computers to perform operations comprising causing a data processing system to adjust the draw amount on the basis of an external constraint on the draw amount.

11. A computer-implemented method comprising:
    maintaining, by one or more computer systems, a steady-state worth of an inhomogeneous renewable resource pool by:
    evaluating, by the one or more computer systems, an indicator of a historical worth of the inhomogeneous renewable resource pool, wherein evaluating an indicator comprises retrieving by the computer system, time series data indicative of the historical worth of the resource pool,
    determining, by the one or more computer systems, a draw amount from the inhomogeneous renewable resource pool, the draw amount determined at least in part on the basis of the indicator; and
    outputting, by the one or more computer systems, data representative of the draw amount determined so as to maintain the steady state worth of the inhomogeneous renewable resource pool.

12. The method of claim 11, wherein evaluating an indicator comprises low-pass filtering the time series data.

13. The method of claim 11, wherein evaluating an indicator comprises determining an average value of the time series data.

14. The method of claim 11, wherein evaluating an indicator comprises retrieving synthetic time series data indicative of what a historical worth of the renewal resource pool would have been.

15. The method of claim 11, wherein determining a draw amount comprises determining a pre-determined fraction of the historical worth.

16. The method of claim 11, further comprising adjusting the draw amount on the basis of an external constraint on the draw amount.

17. The method of claim 11, wherein the inhomogeneous resource pool is an endowment fund, the method further comprising:
- retrieving data indicative of an historical worth of the endowment fund, and
- wherein evaluating an indicator of historical worth comprises retrieving a plurality of selected values indicative of the worth of the endowment fund at each of a corresponding plurality of times.

18. A system comprising:
- one or more computers and one or more storage devices storing instructions that are operable, when executed by the one or more computers, to cause the one or more computers to perform operations comprising:
  - maintaining, by one or more computer systems, a steady-state worth of an inhomogeneous renewable resource pool by:
    - evaluating, by the one or more computer systems, an indicator of a historical worth of the inhomogeneous renewable resource pool, wherein evaluating an indicator comprises retrieving by the computer system, time series data indicative of the historical worth of the resource pool,
    - determining, by the one or more computer systems, a draw amount from the inhomogeneous renewable resource pool the draw amount determined at least in part on the basis of the indicator; and
    - outputting, by the one or more computer systems, data representative of the draw amount determined so as to maintain the steady state worth of the inhomogeneous renewable resource pool.

19. The system of claim 18, wherein instructions for causing the one or more computers to evaluate an indicator comprise instructions for causing a data processing system to low-pass filter the time series data.

20. The system of claim 18, wherein the instructions for causing the one or more computers to evaluate an indicator comprise instructions for causing a data processing system to determine an average value of the time series data.

* * * * *